United States Patent [19]

Steinberg

[11] 4,281,642

[45] Aug. 4, 1981

[54] SOLAR COLLECTOR CONSTRUCTION

[76] Inventor: Hyman A. Steinberg, 7200 NW. 78th St., Tamarac, Fla. 33319

[21] Appl. No.: 91,156

[22] Filed: Nov. 5, 1979

[51] Int. Cl.³ .......................... F24J 3/02; F28F 13/00
[52] U.S. Cl. .................................. 126/447; 126/450; 165/136
[58] Field of Search ............... 126/441, 449, 446, 447, 126/450, 417; 165/135, 136

[56] References Cited

U.S. PATENT DOCUMENTS

| | | | |
|---|---|---|---|
| 2,637,530 | 5/1953 | Janos | 165/136 |
| 3,231,339 | 1/1966 | Murthy et al. | 165/136 |
| 3,980,071 | 9/1976 | Barber | 126/447 |
| 4,046,135 | 9/1977 | Root et al. | 126/450 |
| 4,062,352 | 12/1977 | Lesk | 126/450 |
| 4,084,574 | 4/1978 | Golay | 126/447 |
| 4,084,575 | 4/1978 | Nicewonger | 126/446 |
| 4,092,977 | 6/1978 | Gurtler | 126/450 |
| 4,119,085 | 10/1978 | Knowles et al. | 126/443 |
| 4,138,990 | 2/1979 | Hussmann | 126/450 |
| 4,147,155 | 4/1979 | Krafft | 126/450 |
| 4,149,522 | 4/1979 | Keeling | 126/441 |
| 4,173,969 | 11/1979 | Scholl | 126/447 |
| 4,196,717 | 4/1980 | Giuganino | 126/450 |
| 4,203,425 | 5/1980 | Clark | 126/450 |
| 4,204,522 | 5/1980 | Wilson | 126/447 |

FOREIGN PATENT DOCUMENTS

2835371  2/1979  Fed. Rep. of Germany .......... 126/447

*Primary Examiner*—Daniel J. O'Connor
*Attorney, Agent, or Firm*—Malin & Haley

[57] ABSTRACT

A rigid, supportive cell structure disposed within an evacuated or partially evacuated space between a metallic solar collector plate with an attached fluid conduit and an outer, protective cover plate below the collector plate. The walls of the cell structure are comprised of thin, non-heat-conductive strips of material which are perpendicular to the collector plate and the cover plate and divide them into a multiplicity of evacuated cells having greatly increased insulation value and strength. The combination is a supportive cell structure below the collector plate and a supportive cell structure above the collector plate.

A copending application, Ser. No. 076,971, was filed Sept. 20, 1979 on the supportive cell structure above the collector plate.

2 Claims, 5 Drawing Figures

SOLAR COLLECTOR CONSTRUCTION

BACKGROUND OF THE INVENTION

This invention relates generally to solar energy conversion devices such as flat-plate collectors, and more particularly to an improved flat-plate collector construction for retaining heat energy in such devices.

In current practice, flat-plate solar collectors used for heating air, water and various fluids are insulated beneath the collector plate and its attached fluid conduit with fiberglass or plastic foam insulation to reduce the heat loss from the back of the collector plate and its attached fluid conduit. This heat loss is a crucial factor affecting the overall efficiency of flat-plate solar collectors.

In addition to the high cost of conventional insulating materials, their limited insulating value, due to entrapped, conductive air or gas cells, places many limitations on the design and efficiency of flat-plate collectors. Until now, there has been no completely effective method for reducing the heat loss below the collector plate without incurring the weight and cost penalties of the added bulk of conventional insulating materials. Although it is evident that convective heat loss can be eliminated by the evacuation of air within the space adjacent to a heated object, this principle has not heretofore been applied to flat-plate solar collectors, primarily due to the lack of a practical means for preventing the collapse or deformation of the collector plate and fluid conduit, or the back of the collector, without the use of a massive support structure which would, in itself, introduce large conductive heat losses across the evacuated space.

SUMMARY OF THE INVENTION

The present invention relates to a new end improved flat-plate solar collector construction wherein the efficiency of conversion of solar energy to heat and its transfer to a moving fluid is greatly increased.

In accordance with the present invention, a flat-plate solar collector is provided with a black-surfaced collector plate to which a fluid conduit is attached or made a part of. A rigid, supportive cell structure is disposed centrally within the space between the collector plate and the back cover plate of the collector. The space between the plates is substantially evacuated. The cell structure is a non-heat-conductive material, such as plastic or treated paper, having cell walls positioned substantially perpendicular to the collector plate and the back cover plate. One or more thin, heat-reflective films are disposed across and within the cell structure, being substantially parallel to the collector plate. The heat generated on the surface of the collector plate and transferred by conduction to the fluid conduit is prevented from being dissipated through the back cover plate by conduction or convection, due to the evacuated space between the plates. Furthermore, heat loss by radiation from the collector plate and conduit is prevented by means of one or more heat-reflective barriers disposed between the plates. The combination of supportive cell structures above and below the collector plate is an evacuated solar collector.

Accordingly, it is an object of this new and improved invention to substantially eliminate conductive, convective and radiative heat losses from the back of the collector plate and its attached conduit by substantially evacuating the space below the collector plate and interposing one or more radiative heat barrier surfaces within the evacuated space.

It is a further object of this invention to provide a supportive cell structure between a collector plate with a fluid conduit and back cover plate, which supportive cell structure strengthens the collector plate, the fluid conduit and the back cover plate, preventing them from buckling or fracturing due to the stress of handling and shipping or the stress of atmospheric pressure.

Another object of this invention is to enable a reduction in the thickness and weight of flat-plate solar collector construction. For example, to achieve the insulating value equivalent to an evacuated space with heat radiation barriers would require the use of conventional insulating materials having many times the thickness and weight of the evacuated construction.

An additional object of this inventon is to provide a supportive cell structure above and below the collector plate in an evacuated solar collector.

In accordance with these and other objects, which will be apparent hereinafter, the instant invention will now be described with particular reference to the accompanying drawings.

DESCRIPTION OF THE PREFERRED EMBODIMENT

Figure 1:
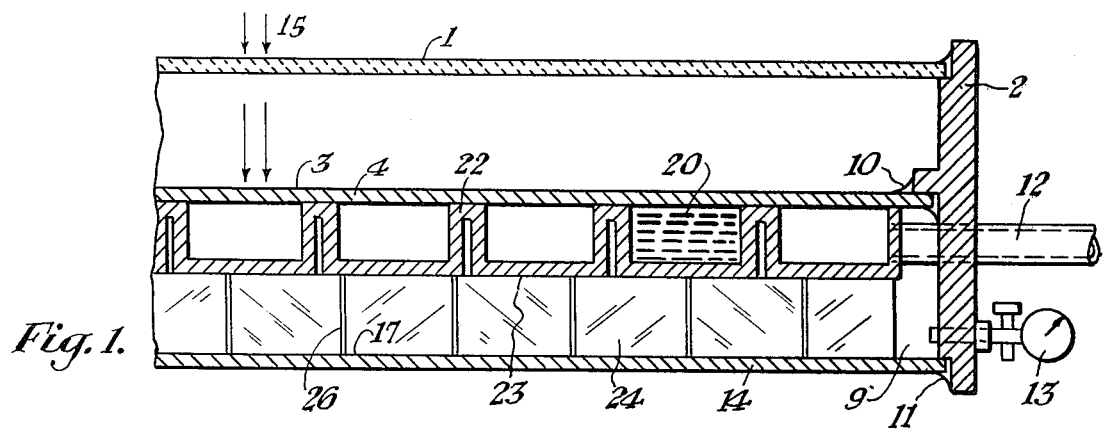
FIG. 1 is a partial sectional view of a flat-plate solar collector construction, illustrating a supportive cell structure disposed within the evacuated area below a collector plate having a relatively flat fluid conduit.

Referring now in detail to the drawings, wherein an embodiment of the present invention is shown, and referring particularly to FIG. 1, a flat-plate solar collector is illustrated as having a rectangular or square outer frame 2, which supports and encloses a transparent cover plate 1 and a collector plate 4 at one side of the frame opening, wherein solar radiation, as illustrated by numeral 15, is received and converted to heat at a blackened surface 3. The collector plate 4 is attached to or made a part of the metallic conduit 22, which has a reflective surface 23 and contains a moving fluid 20 for transferring heat from the collector plate 4 to a distant point of use or storage through the pipe 12. The outer frame 2 may be made entirely or partially of a non-porous insulating plastic material.

The opposite side of the frame opening supports a non-porous plastic or metal cover plate 14, having a reflective surface 17, and a cellular support structure 24, said support structure being adhesively secured to cover plate 14 and conduit 22, and the space 9 between the cover plate 14 and the collector plate 4 being partially or substantially evacuated. The walls of the cellular structure 26, which are perpendicular to and between the conduit 22 and the cover plate 14 below it, prevent the collapse of the plates and conduit due to the vacuum, or partial or substantial evacuated space between them.

Radiative heat loss from the conduit 22 and the collector plate 4, to and through the cover plate 14, is virtually eliminated due to the reflective surfaces 17 on cover plate 14 and 23 on conduit 22. Conductive and convective heat losses are substantially eliminated, due to the evacuated space 9 between the cover plate 14 and collector plate 4, and the minimal area of cell structure contact between the cover plate 14 and conduit 22.

Figure 2:
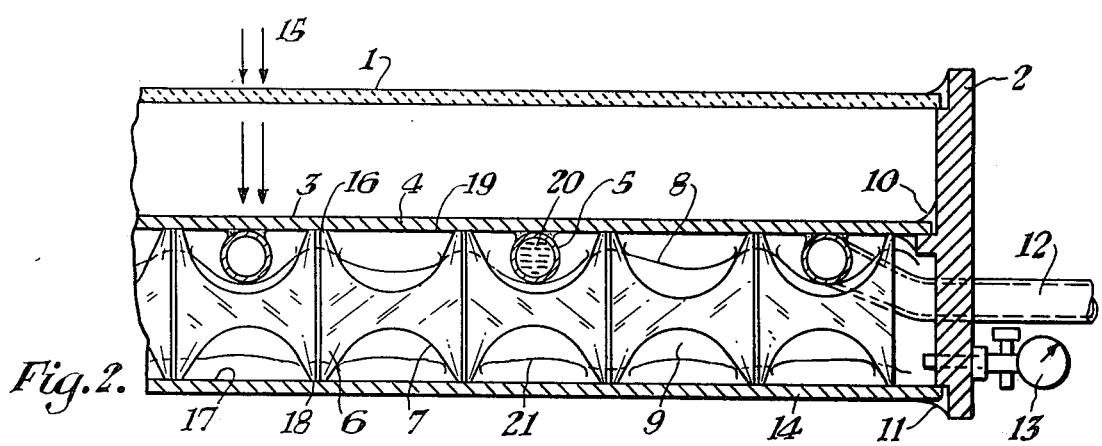
FIG. 2 is a partial sectional view of a flat-plate solar collector with a supportive cell structure that has reduced edge contact areas and metallic foil radiation barriers disposed within the evacuated space.

FIG. 2 illustrates an embodiment of the invention wherein the fluid conduit 5, attached to the collector plate 4, is a pipe or some other irregular shape which does not offer a flat surface for continuous mating with the cellular structure 6. In such instances, the cellular structure's edge surface contact area may be eliminated between cell wall intersection points 16 by reducing the cell wall area 7, thereby preventing interference with the irregular surface of conduits such as 5. Furthermore, the diminished edge contact area serves to reduce conductive heat transfer across the cell structure 6 and also accommodates the placement of reflective foil surfaces 8 and 21 across the cell structure 6. The conduit surface 5, the collector plate surface 19 and the cover plate 17 may also be made reflective to further reduce radiactive heat transfer across the space 9.

Figures 3, 4:
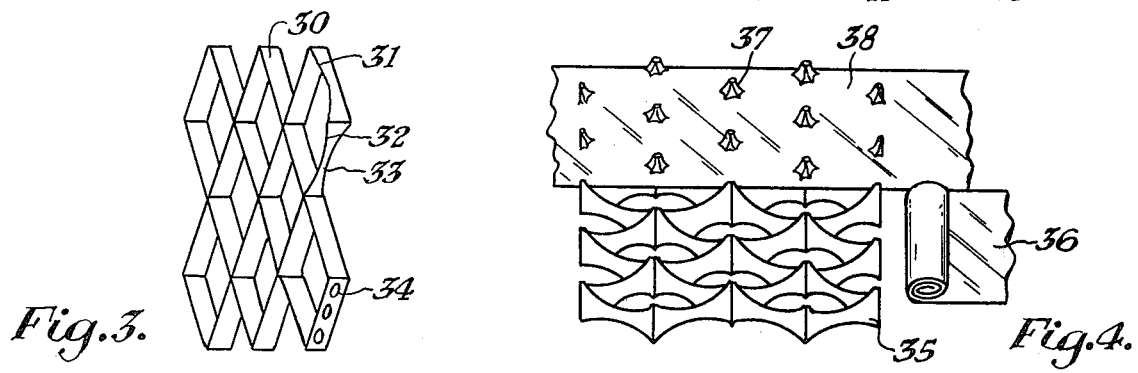
FIG. 3 illustrates several possible patterns for the supportive cell structure assembly.
FIG. 4 is a partial isometric view of a metallic foil radiation barrier being laid into position across the supportive cell structure.

FIG. 3 illustrates several of the variations possible for reducing the cell wall areas and edge contact surfaces of the cell structure 30. One edge surface 31 may be reduced, or both edges 32 and 33 may be reduced. The cell wall surface area may also be reduced by perforations 34 within the cell walls. The cell structure 30 may be constructed as a plurality of individual, detached grids, or an interlocking assembly of thin strips, or it may be fabricated and expanded in the same manner as the paper cell structures commonly used for hollow-core doors and structural panels.

Referring to FIG. 4, one or more reflective foil surfaces may be applied to the cell structure 35 by stretching and depressing the foil 36 across the cell structure 35, so that the cell wall intersection points 37 of the cell structure 35 puncture and protrude from the reflective foil 38. The foil may also be placed in criss-cross fashion across the reduced wall sections of the cell structure 35. Other obvious methods which would position one or more reflective barriers within the cell structure may be used to accomplish the same results. The reflective foil barrier may also be laminated or adhesively fastened to the conduit surface 23, in FIG. 1, and the cover plate surface 17.

Referring again to FIG. 2, the upper edge surface 16 and the lower edge surface 18 of the cell structure 6, may be cemented to the collector plate 4 and cover plate 14 with a high-temperature resistant or thermosetting adhesive, in order to impart the strength of a structural sandwich panel to the collector assembly. Prior to excavating the space 9 between the collector plate 4 and cover plate 14, the space may be filled with a gas that is less heat-conductive than air, such as carbon dioxide, so that only a residue of the lessconductive gas will remain within the space 9 after evacuation. An external valve and vacuum indicator 13, mounted on the frame 2, may be used to periodically check and maintain the vacuum. A non-porous sealant 10 and 11, such as silicone rubber, may be placed around the perimeter of the plates to maintain the vacuum between them.

Figure 5:
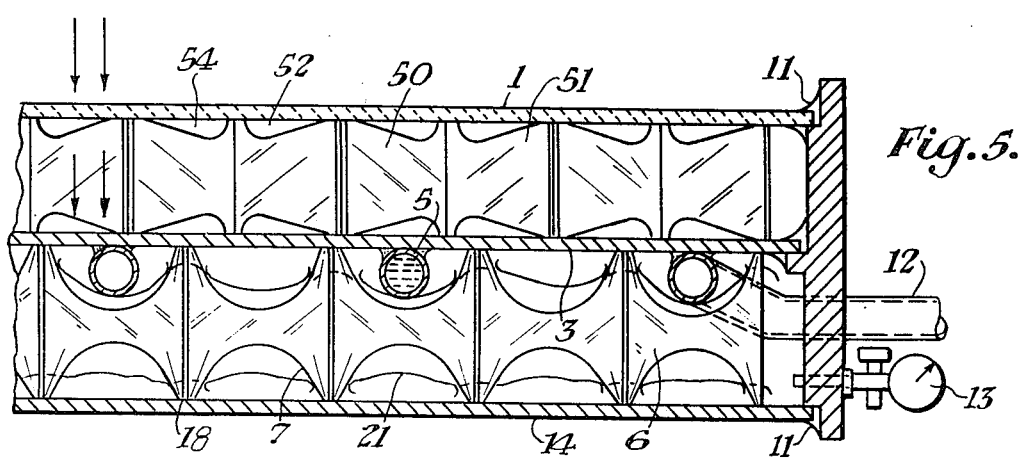
FIG. 5 is a partial sectional view of a flat-plate solar collector having supportive cell structure above and below the collector plate.

Referring now to FIG. 5 showing a supportive cellular structure 6 below the collector plate 3 as set forth in detail above. The external valve and vacuum indicator 13 is in communication with the space above and below the collector plate 3 to provide a partially evacuated or evacuated space. The plate 1 is supported by supportive cellular structures 50 and 51 that may be similar in construction to structure 6 or structure 30 shown in FIG. 3. Structure 50 with spaces 52 and 54 above the structure may be similar to the disclosure in copending application Ser. No. 076,971 which is incorporated herein by reference for reliance thereupon.

It should be noted that the fluid conduit may be located either above, below or within the collector plate in the disclosed device.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a flat-plate solar collector, including an outer frame defining an opening in which an essentially rigid, flat, black collector plate is disposed within the frame, a conduit for collecting heat connected to the collector plate, and a rigid, non-transparent protective cover plate below the collector plate, the improvement for supporting said cover plate and collector plate and reducing heat losses, comprising:

a rigid, supportive cell structure having cell walls generally perpendicular to and positioned between and in contact with the central portion of said collector plate with conduit and said cover plate, said cell structure defining a plurality of cell volumes in the flat-plate collector, and said cell structure being disposed within at least a partially evacuated space between said collector plate with conduit and said cover plate. wherein the cell wall areas of said supportive cell structure are reduced between cell wall intersection points to accomodate surface irregularities of said collector plate with conduit, and wherein a heat-reflective film is disposed within said cell structure, said film being held in suspension by said cell structure and being isolated from said collector plate and said cover plate.

2. A flat-plate solar collector as set forth in claim 1, wherein:

said suspended heat-reflective film is aluminium foil.

* * * * *